United States Patent [19]

Yoshino et al.

[11] Patent Number: 4,609,952
[45] Date of Patent: Sep. 2, 1986

[54] RECORDING AND REPRODUCING APPARATUS

[75] Inventors: Tadashi Yoshino, Neyagawa; Yutaka Ohta, Hirakata, both of Japan

[73] Assignee: Matsushita Electric Industrial Co., Ltd., Kadoma, Japan

[21] Appl. No.: 761,417

[22] Filed: Aug. 1, 1985

[30] Foreign Application Priority Data

Aug. 2, 1984 [JP] Japan ................................ 59-163140
Dec. 21, 1984 [JP] Japan ................................ 59-269956

[51] Int. Cl.$^4$ ............................................ G11B 21/04
[52] U.S. Cl. ............................................ 360/70; 360/75
[58] Field of Search ................... 360/70, 75; 358/338, 358/339

[56] References Cited

U.S. PATENT DOCUMENTS 4,249,220 2/1981 Yasutake et al. ................... 360/70
4,306,254 12/1981 Koda et al. ........................ 360/75
4,490,755 12/1984 Tokuyama ......................... 360/70

FOREIGN PATENT DOCUMENTS 45-20403 7/1970 Japan .

OTHER PUBLICATIONS

Tetsushi Sato, Yoshio Tokuyama and Eiichi Tsuchiya; "All about Victor VHS Video Movie, 'GR-Cl'"; Television Technics & Electronics, pp. 19-27; vol. 32, Apr. 1984.

Primary Examiner—George G. Stellar
Attorney, Agent, or Firm—Cushman, Darby & Cushman

[57] ABSTRACT

In a VTR having a rotary head cylinder (20) having four magnetic heads with 90° angular pitches inbetween on a cylindrical surface thereof, a magnetic recording tape is helically wound around the rotary head cylinder (20), a motor to drive the rotary head cylinder (20) is servo-controlled by utilizing output signal of a phase comparator (10) which compare a first frequency divider (62) to divide frequency of output signal of a rotation phase detector (7) into N/(2N−2) times and an output signal of a second frequency divider (61) for dividing frequency of vertical synchronization signal ($S_v$) of video signal into ½ times, and thereby accurate phase control of the rotary head cylinder is attainable.

3 Claims, 6 Drawing Figures

RECORDING AND REPRODUCING APPARATUS

BACKGROUND OF THE INVENTION

1. Field of the Invention

The present invention relates generally to a recording and reproducing apparatus, and particularly to recording and reproducing apparatus for video signal on a recording tape by using rotary heads, and more particularly to a VTR for recording and reproducing video signal on and from a magnetic recording tape by using rotary recording and reproducing heads.

2. Description of the Prior Art

In the conventional video tape recorder wherein plural rotary magnetic heads are disposed with uniform angular pitch on a rotary head cylinder and a recording tape, e.g., magnetic tape is wound around the rotary head cylinder in helical manner with a predetermined angle. Therein, the plural rotary heads are switched for operation in turn to sequentially record or reproduce the video signal for one field on a recording track disposed oblique with respect to the longitudinal direction of the recording tape. In such recording and reproducing apparatus of helical scanning type, an improvement has been proposed as shown in FIG. 6 for decreasing diameter of the rotary head cylinder (Japanese Unexamined Published Patent Application Sho No. 45-20403).

Figure 6:
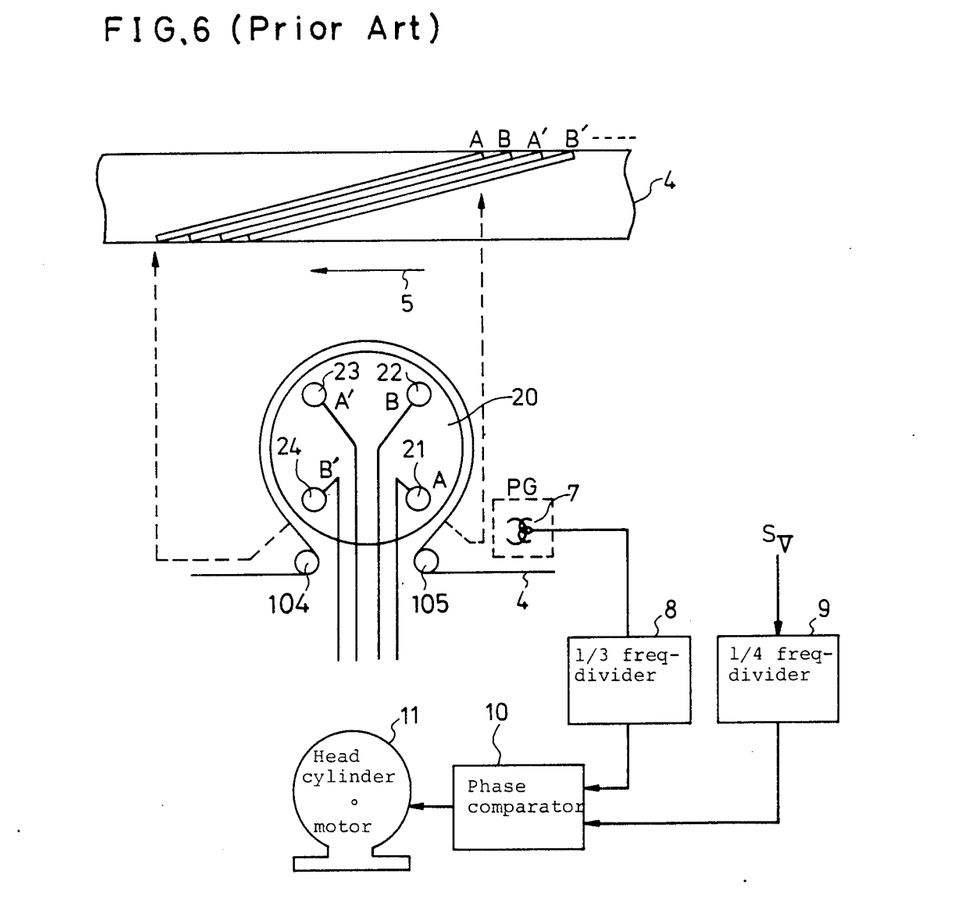
FIG. 6 is the block diagram of main parts of the recording and reproducing apparatus of the prior art.

That is, as shown in FIG. 6, the recording and reproducing apparatus of the prior art comprises four magnetic heads 21, 22, 23 and 24 which are disposed on the cylindrical surface of a rotary head cylinder 20 with uniform 90° angular pitches with each other. And among them, each pair of two magnetic heads are disposed with 180° angle pitch each other. And, a pair of the magnetic heads 21 and 23 have the same azimuth angle each other; and the other pair of the magnetic heads, namely, the magnetic heads 22 and 24 have another same azimuth angle which is different from that of the former one. A magnetic recording tape 4, face of which is schematically drawn in an upper part of FIG. 6 show the recording track, is wound around the rotary head cylinder 20 for over 270° angle of the cylindrical surface, by means of known tape driving means 104, 105. In the above-mentioned configuration, when the magnetic heads are switched in an order of the magnetic heads 21, 22, 23, 24, 21, 22 . . . , oblique tracks A, B, A', B', A, B . . . are obtainable on the magnetic recording tape 4 as shown in FIG. 6.

At this time, since there is a necessity that video signal for one field is recorded on one recording tracks A, B, A' or B', the rotary head cylinder 20 must be driven to rotate in synchronism with vertical synchronization signal of the video signal to be recorded. That is, the rotary head cylinder 20 must be rotated for $\frac{3}{4}$ turn during one period of the vertical synchronization signal, keeping accurate phase synchronization with the vertical synchronization signal.

Accordingly, in the prior apparatus, output signal of a rotary phase detector 7 is divided to $\frac{1}{3}$ by a $\frac{1}{3}$ frequency divider 8 thereby producing a signal of 15 Hz which is the greatest common between 45 Hz of output of the rotary phase detector 7 of the rotary head cylinder 20 and 60 Hz (in case of NTSC) of vertical synchronization signal of television video signal to be recorded. And on the other hand, by dividing the vertical synchronization signal $S_v$ obtained from the television video signal to be recorded to $\frac{1}{4}$ times by a $\frac{1}{4}$ divider 9 thereby producing a second 15 Hz signal, and then by comparing phases of the above-mentioned two 15 Hz signals by a phase comparator 10, a cylinder motor 11 is servo-controlled so that both phases of the above-mentioned two signals coincide.

In the above-mentioned configuration of the prior art apparatus, the cylinder motor 11 is servo-controlled by using a signal having such a low frequency as 15 Hz. And therefore, the rotary head cylinder 20 is controlled of each phase by means of the 15 Hz signal which is issued for every 3 turns of the rotary head cylinder 20. Accordingly, the phase control in the prior art is not necessarily accurate enough.

SUMMARY OF THE INVENTION

Purpose of the present invention is to provide a recording and reproducing apparatus having a high control accuracy characteristic of rotation of a rotary head cylinder, by producing a switching signal for switching plural rotary heads and phase control signal for accurately controlling rotation phase of the rotary head cylinder, by utilizing a signal obtained from a rotary phase generator and vertical synchronization signal of video signal to be recorded.

Another purpose of the present invention is to provide a recording and reproducing apparatus comprising:

a rotary head cylinder having N (an even number of 4 or more) magnetic heads provided on periphery thereof with uniform angular pitch of 360°/(N) around its axis of rotation, with their azimuth angle differing alternately each other, tape driving means for driving a magnetic recording tape by helically winding around the periphery of the rotary head cylinder for an angular range of $360° \times (1 - 1/N)$ or more around the axis of rotation so that oblique recording tracks are formed on the tape by rotation of the rotary head cylinder and helical driving of the recording tape around and on the rotary head cylinder, a rotation phase detector for detecting rotation phase of a selected magnetic head among the N magnetic heads, first frequency dividing means for dividing frequency of output signal of the rotation phase detector to $N/(2N-2)$ times, second frequency dividing means for dividing frequency of vertical synchronization signal of a video signal to be recorded or an equivalent signal thereto to $\frac{1}{2}$ times, a phase comparator for comparing phases of output signal of the first frequency dividing means and output signal of the second frequency dividing means, to produce a signal of phase difference, and phase controlling means for controlling phase of rotation of the rotary head cylinder in a manner that phase difference of output signal of the phase comparator is controlled to be a predetermined value.

According to the present invention, by utilizing output signal of the rotary phase generator and signal of the rotation information generator, such as a frequency generator, accurate phase control of rotation suitable for plural head type recording and reproducing apparatus and also for IC circuit configuration is obtainable.

Furthermore, by selecting the frequency of the frequency generator to $3 \cdot M \cdot f_v$, wherein M is a positive integer and $f_v$ is a frequency of vertical synchronization signal, a frequency of a video signal to be controlled and to be supplied to a phase control circuit of the rotary head cylinder can bee selected as $\frac{1}{2} f_v$, and thereby control characteristic of the phase control of the rotary head cylinder becomes good.

The above and other objects and features of the invention will appear in the following description and appended claims.

DETAILED DESCRIPTION OF THE PREFERRED EMBODIMENT

Figure 1:
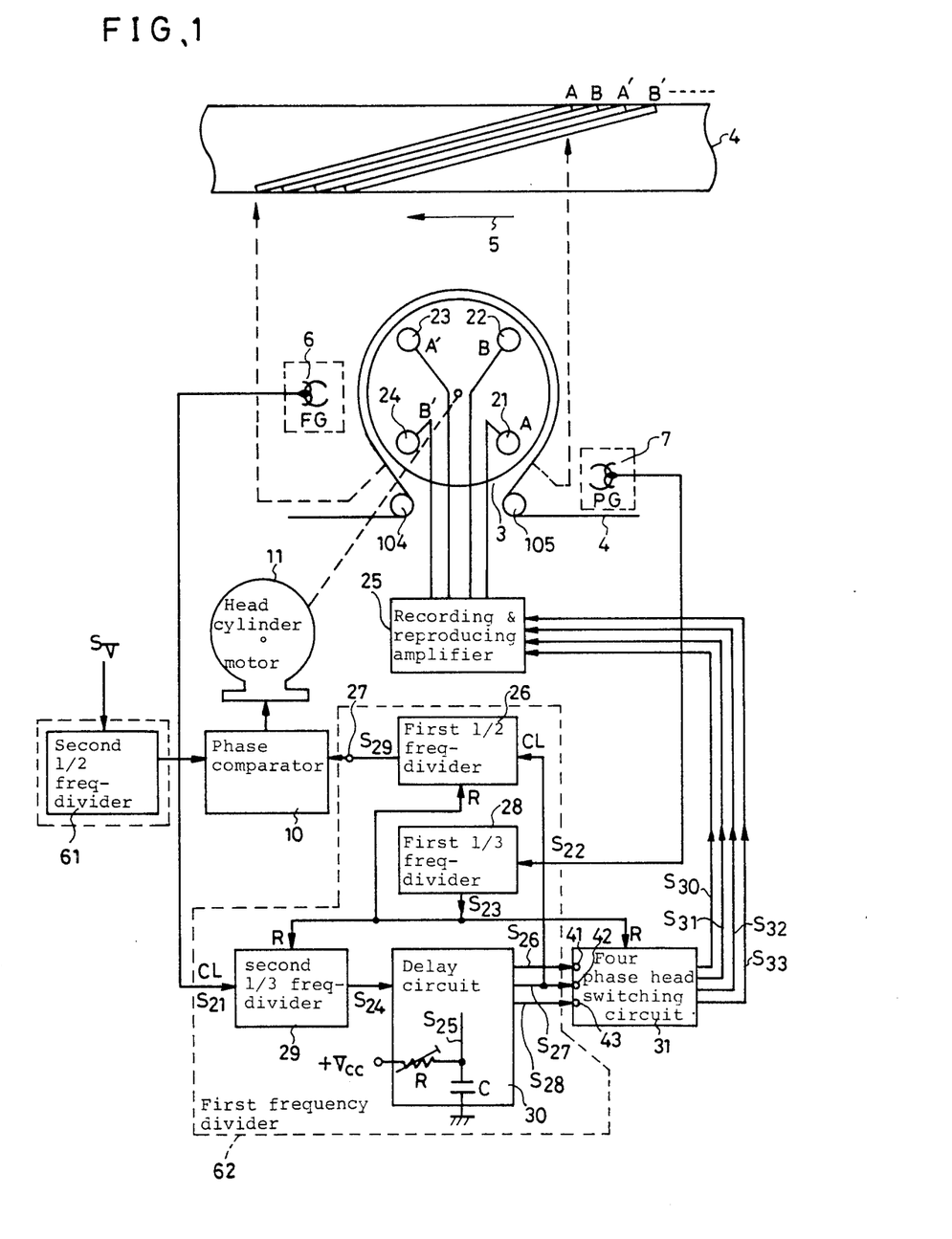
FIG. 1 is a block diagram of a four head type magnetic recording and reproducing apparatus as a preferred embodiment comprising a head switching signal generation circuit and a circuit for producing controlled signal for a phase control circuit of a rotary head cylinder.

As shown in FIG. 1, the recording and reproducing apparatus of a preferred embodiment in accordance with the present invention comprises a rotary head cylinder 20 which has four magnetic heads 21, 22, 23 and 24 which are disposed on an outer face of a cylindrical surface of a rotary head cylinder with uniform 90° angular pitches with each other. Among the four magnetic heads 21, 22, 23 and 24, each pair of two magnetic heads are disposed with 180° angle pitch each other. And, a pair of the magnetic heads 21 and 23, which are disposed with 180° angle pitch between each other have the same azimuth angle each other, and the other pair of the magnetic heads 22 and 24, which are disposed with 180° angle pitch between each other have another same azimuth angle which is different from that of the former one. A magnetic recording tape 4, face of which is schematically drawn in an upper part of FIG. 1 to show the recording track, is wound around the rotary head cylinder 20 for over 270° angle of the cylindrical surface, by means of known tape driving means 104, 105. In the above-mentioned configuration, when the magnetic heads are switched in an order of the magnetic heads 21, 22, 23, 24, 21, 22, . . . , oblique tracks A, B, A', B', A, B, . . . are obtainable on the magnetic recording tape 4 as shown in FIG. 1.

Figure 2:
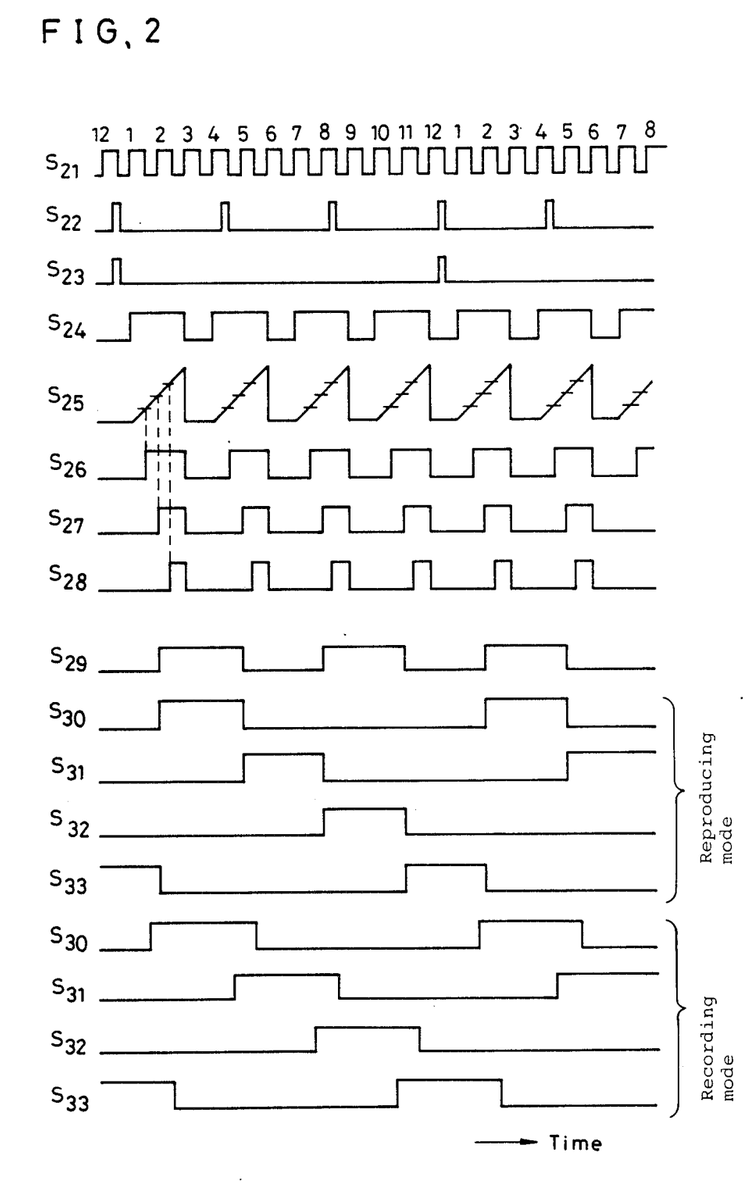
FIG. 2 is a waveform chart showing waveforms of various parts of FIG. 1.

A rotation phase detector 7 for generating a signal to indicate phase of rotation of the rotary head cylinder 20 issues a signal $S_{22}$ to a first $\frac{1}{3}$ frequency divider 28, which divides the phase signal into $\frac{1}{3}$ times to produce a $\frac{1}{3}$ divided signal $S_{23}$ shown in FIG. 2. A rotation information generator, such as a frequency generator 6 which issues information about rotation of the rotary head cylinder 20 issues a rotation information signal, which is designed to issue a signal of a frequency of $3.M.f_v$, wherein M is a positive integer and $f_v$ is a frequency of vertical synchronization signal, for instance, a signal $S_{21}$ of FIG. 2 of 180 Hz, is given as a clock signal to a clock signal terminal of a second $\frac{1}{3}$ frequency divider 29. The output signal $S_{23}$ of the first $\frac{1}{3}$ frequency divider 28 is given to a reset signal input terminal R of the second $\frac{1}{3}$ frequency divider 29. Therefore, the second $\frac{1}{3}$ divider 29 issues output signal $S_{24}$ to a delay circuit 30. The delay circuit 30 has a time constant circuit consisting of a variable resistor R and a timer capacitor C which are connected between a positive power source $+V_{cc}$ and the ground level. Each square pulses of the signal $S_{24}$ is integrated in the capacitor C thereby to produce a saw-tooth signal $S_{25}$, and by comparing the saw-tooth signal with a first, a second and a third threshold potentials set in the delay circuit 30 as shown in the waveform $S_{25}$ of FIG. 2, a first, a second and a third delay time output signals $S_{26}$, $S_{27}$ and $S_{28}$ of FIG. 2 are issued. The second delay time output signal $S_{27}$ is given as a clock signal to a clock signal terminal CL of a first $\frac{1}{2}$ frequency divider 26, and the output of the first $\frac{1}{3}$ frequency divider 28 is given as a reset signal to a reset signal input terminal R of the first $\frac{1}{2}$ frequency divider 26. Accordingly, the first $\frac{1}{2}$ frequency divider 26 issues an output signal $S_{29}$ of FIG. 2. This output signal $S_{29}$ is then given through an output terminal 27 to a phase comparator 10, wherein the signal $S_{29}$ is compared with an output signal from a second $\frac{1}{2}$ frequency divider 61 which divides vertical synchronization signal $S_v$ obtained from a video signal to be recorded to $\frac{1}{2}$. By utilizing the resultant phase comparison output from the phase comparator 10, the rotation phase of the rotary cylinder motor 11 is controlled.

On the other hand, output signals $S_{26}$, $S_{27}$ and $S_{28}$ of the delay circuit 30 are given to a four phase head switching circuit 31, which issues set of signals $S_{30}$, $S_{31}$, $S_{32}$ and $S_{33}$ which vary responding to modes of recording and reproducing as shown in the waveforms $S_{30}$ through $S_{33}$ of reproducing mode and $S_{30}$ through $S_{33}$ of recording mode of FIG. 2.

Figure 3:
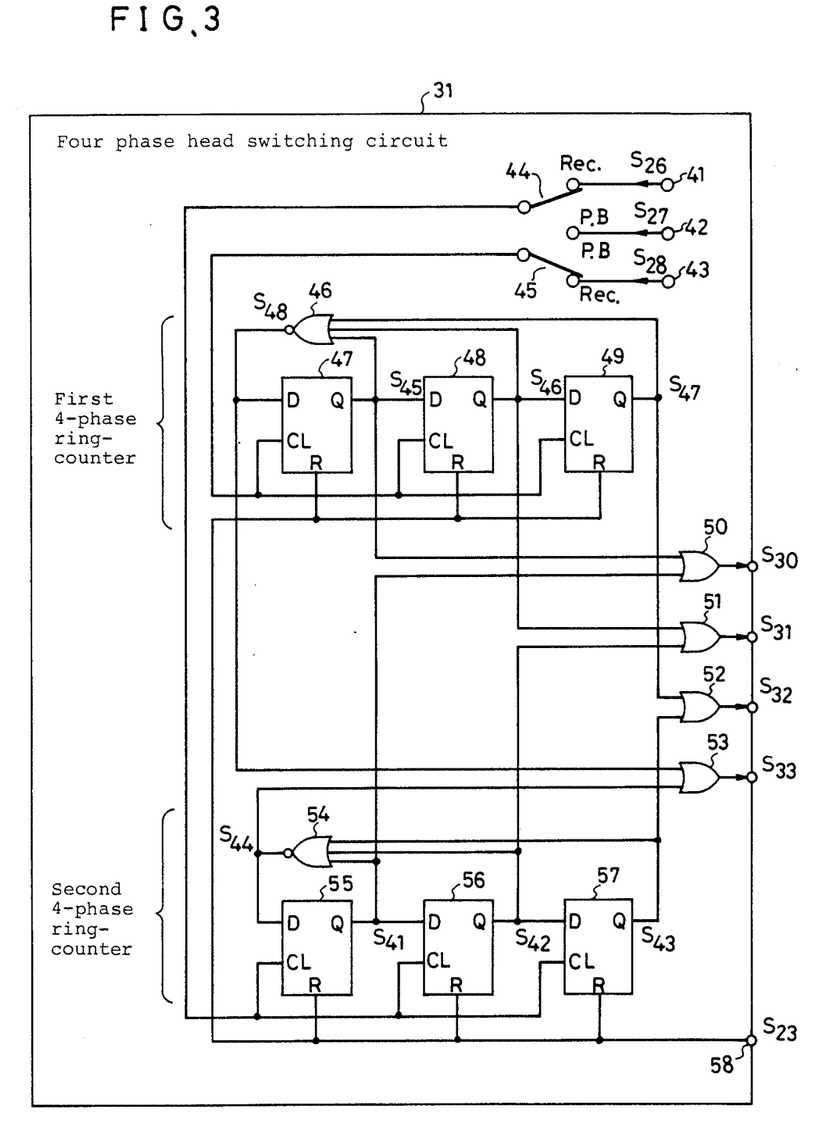
FIG. 3 is one example of generator circuit of a 4 phase head switching signal.
Figure 4:
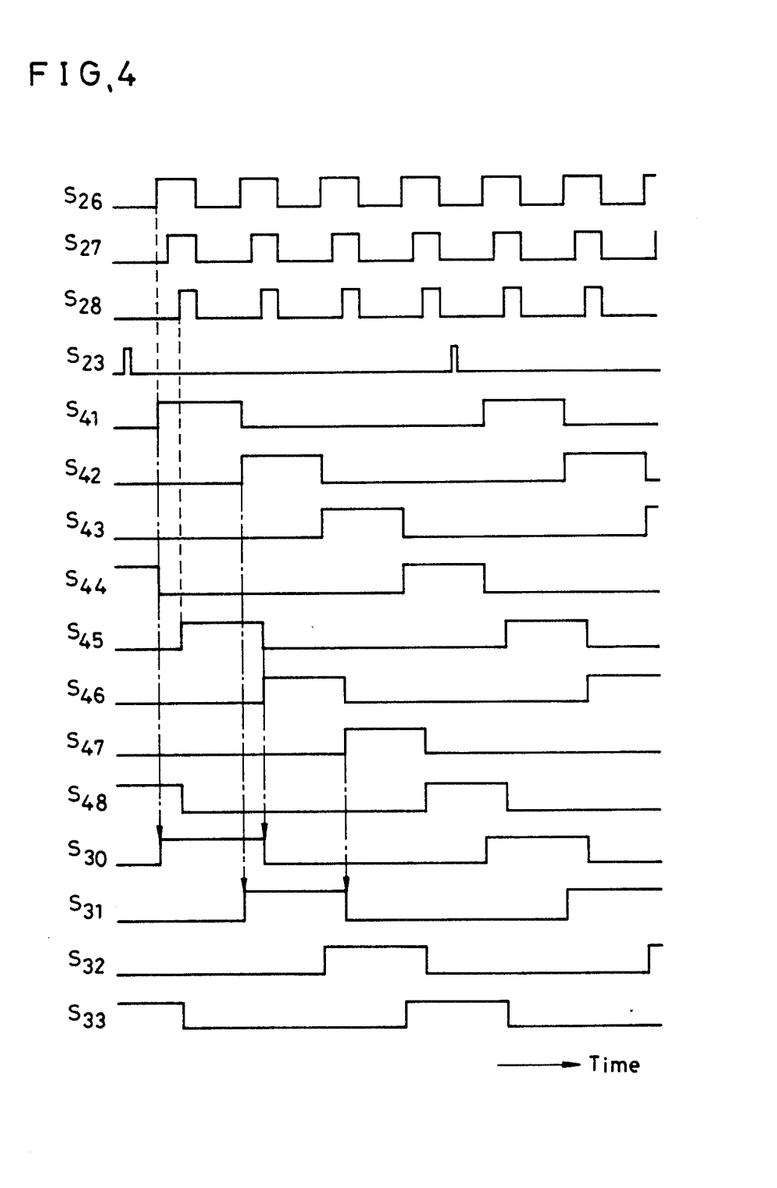
FIG. 4 is a waveform chart showing waveforms of various parts of FIG. 3 in recording mode.
Figure 5:
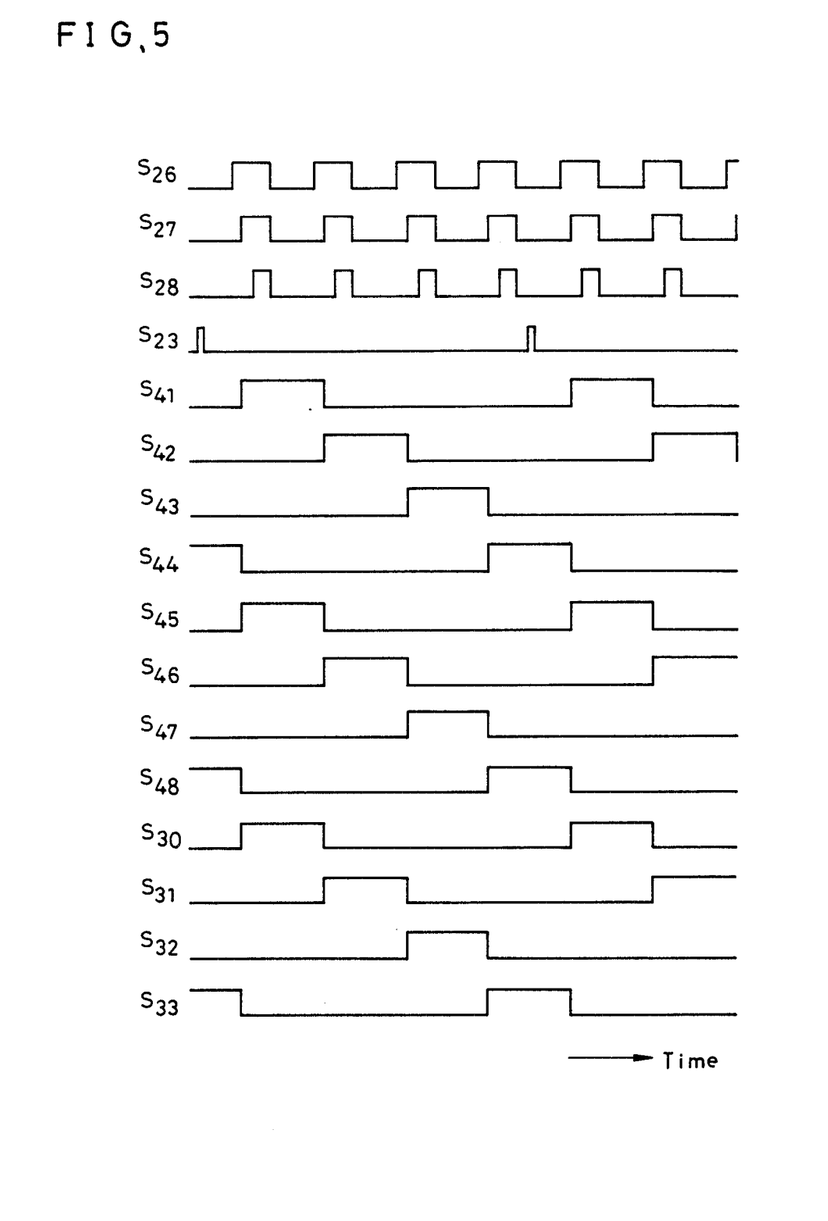
FIG. 5 is a waveform chart showing waveforms of various parts of FIG. 3 in reproducing mode.

FIG. 3 shows a practical example of the four phase head switching circuit 31, and FIG. 4 shows waveforms of various parts of FIG. 3 when the apparatus is in the recording mode, and FIG. 5 shows waveforms of various parts when the apparatuses is in the reproducing mode. As shown in FIG. 3, output signals $S_{26}$, $S_{27}$ and $S_{28}$ from the delay circuit 30 is given to the input terminals 41, 42 and 43, respectively. By means of the change-over switches 44 and 45, the signals $S_{26}$ and $S_{28}$ are selected as input signals when the mode is the recording mode, and on the contrary when the mode is the reproducing mode, the signal $S_{27}$ only is used as the input signal. A D-type flip-flops 47, 48 and 49 each with reset terminal R and a NOR gate 46 together constitute a first four phase ring-counter, which takes the signal $S_{28}$ as clock signal when the mode is the recording mode, and on the contrary, takes the signal $S_{27}$ as the clock signal when the mode is the reproducing mode. As a reset signal the output signal $S_{23}$ of the first $\frac{1}{3}$ frequency divider 28 is inputted to this four phase head switching circuit 31 through an input terminal 58.

In the same way as above, D-type flip-flops 55, 56 and 57 each with reset terminal R and a second NOR gate 54 constitute a second four phase ring-counter, which takes the signal $S_{26}$ as clock signal when the mode is the recording mode, and the signal $S_{27}$ when the mode is the reproducing mode, and the same reset signal $S_{23}$ is given through the input terminal 58. When the reset signal $S_{23}$ is in high level, all outputs of the D-type flip-flops 47, 48, 49, 55, 56 and 57 become low level, hence making outputs of the NOR gates 46 and 54 to high level. Thereafter, at every incomings of the clock input signal the high level states are shifted rightwards by one stage, thereby producing signals $S_{41}$, $S_{42}$, $S_{43}$ and $S_{44}$ of FIG.

4, and also the signals $S_{45}$, $S_{46}$, $S_{47}$ and $S_{48}$. The OR gates 50, 51, 52 and 53 are for producing logic sum of output signals of the four phase ring-counters and output of them serve to secure information for overlapped wound up components of magnetic recording tape 5 around the rotary head cylinder in the recording mode, thereby to produce output signals $S_{30}$, $S_{31}$, $S_{32}$ and $S_{33}$.

Output signals $S_{30}$, $S_{31}$, $S_{32}$ and $S_{33}$ of the four phase head switching circuit 31 are given to the recording and reproducing amplifier 25, and makes overlapping recording of an angular range of $[270°+\Delta\theta]$ on the recording tape 4, which is wound up around the rotary head cylinder 20 and is driven in helical direction by changing over the recording currents to the recording heads 21, 22, 23 and 24. In the reproducing mode, by the variable resistor R in the delay circuit 30 is adjusted so that switching timings of the reproduced output from the magnetic tape 4 coincide with those of the magnetic heads 21, 22, 23 and 24, thereby to make head phase adjusting and obtain reproduced output for each head for every 270° angle of rotation of the rotary head cylinder 20.

Apart from the above-mentioned embodiment, several modified embodiments can be made, for example, by providing six magnetic heads on the cylindrical surface of the rotary head cylinder and by helically winding the magnetic tape for angular range of 300° around its rotation axis on the cylindrical surface, or else, providing eight magnetic heads and helically winding the magnetic tape for angular range of 315° around its rotation axis on the cylindrical surface, and so on. That is, when number of magnetic heads are provided on the cylindrical surface with equal angular pitch inbetween, provided the number of the heads is N, which is even positive integer of 4 or more, the phase comparison to be made by the phase comparator 10 is done between a first signal made by dividing a frequency of output signal of the rotation phase detector 7 for detecting phase of rotation of the head cylinder 20 to $N/(2N-2)$ times, and a second signal produced by dividing a frequency of vertical synchronization signal of an image signal to be recorded or an equivalent signal thereto to $\frac{1}{2}$ times. That is, a group of circuits of a $1/(N-1)$ frequency divider 28 to divide output signal of the rotation phase detector 7 $1/(N-1)$ times, a rotation information detector 6 which detects rotation information of the rotary head cylinder 20, to issue a signal of a frequency $M.(N-1).f_v$ wherein M is a positive integer and $f_v$ is a frequency of vertical synchronization signal, a $1/(M(N-1)$ frequency divider 29 which divides frequency of output signal of the rotation information detector 6 to $1/(M(N-1)$ times and is reset by output signal of the $1/(N-1)$ frequency divider 28 and a $\frac{1}{2}$ frequency divider 26 which divides frequency of output signal of the $1/(M(N-1))$ frequency divider 29 to $\frac{1}{2}$ times and is reset also by output signal of the $1/(N-1)$ frequency divider 28 constitute a first frequency divider 62. Furthermore, the rotation information detector 6 is to be designed to issue an output signal having a frequency of $M(N-1).f_v$, in order to obtain the results of the present invention. The above-mentioned example of FIG. 1 is the case wherein $M=1$ and $N=4$.

It is further understood by those skilled in the art that the foregoing description is made as to a preferred embodiment of the disclosed invention and that various changes and modifications may be made according to the invention without departing from the spirit and scope thereof.

What is claimed is:

1. A recording and reproducing apparatus comprising:
   a rotary head cylinder having N (an even number of 4 or more) magnetic heads provided on periphery thereof with uniform angular pitch of $360°/N$ around its axis of rotation, with their azimuth angle differing alternately each other,
   tape driving means for driving a magnetic recording tape by helically winding around said periphery of said rotary head cylinder for an angular range of $360° \times (1-1/N)$ or more around said axis of rotation so that oblique recording tracks are formed on said tape by rotation of said rotary head cylinder and helical driving of said recording tape around and on said rotary head cylinder,
   a rotation phase detector for detecting rotation phase of a selected magnetic head among said N magnetic heads,
   first frequency dividing means for dividing frequency of output signal of said rotation phase detector to $N/(2N-2)$ times,
   second frequency dividing means for dividing frequency of vertical synchronization signal of a video signal to be recorded or an equivalent signal thereto to $\frac{1}{2}$ times,
   a phase comparator for comparing phases of output signal of said first frequency dividing means and output signal of said second frequency dividing means, to produce a signal of phase difference, and
   phase controlling means for controlling phase of rotation of said rotary head cylinder in a manner that output signal of phase difference of said phase comparator is controlled to be a predetermined value.

2. A recording and reproducing apparatus in accordance with claim 1, wherein said first frequency dividing means comprises:
   a $1/(N-1)$ frequency divider to divide output signal of said rotation phase detector to $1/(N-1)$ times,
   a rotation information detector which detects rotation information of said rotary head cylinder, to issue a signal of a frequency $M.(N-1).f_v$, wherein M is a positive integer and $f_v$ is a frequency of vertical synchronization signal,
   a $1/(M(N-1))$ frequency divider which divides frequency of output signal of said rotation information detector to $1/(M(N-1))$ times, and is reset by output signal of said $1/(N-1)$ frequency divider, and
   a $\frac{1}{2}$ frequency divider which divides frequency of output signal of said $1/(M(N-1))$ frequency divider to $\frac{1}{2}$ times and is reset also by output signal of said $1/(N-1)$ frequency divider.

3. A recording and reproducing apparatus comprising:
   a rotary head cylinder having N (an even number of 4 or more) magnetic heads provided on periphery thereof with uniform angular pitch of $360°/N$ around its axis of rotation, with their azimuth angle differing alternately each other,
   tape driving means for driving a magnetic recording tape by helically winding around said periphery of said rotary head cylinder for an angular range of $360° \times (1-1/N)$ or more around said axis of rotation so that oblique recording tracks ar formed on said tape by rotation of said rotary head cylinder and helical driving of said recording tape around and on said rotary head cylinder, a rotation phase detector for detecting rotation phase of a selected magnetic head among said N magnetic heads, a 1/(N−1) time frequency divider for dividing frequency of output signal of said rotation phase detector to 1/(N−1) times, rotation information detector for generating a rotation information signal having a frequency of M.(N−1).$f_v$, wherein M is a positive integer and $f_v$ is a frequency of vertical synchronization signal for one rotation of said rotary head cylinder, a 1/(M.(N−1)) time frequency divider which divides frequency of output signal of said rotation information detector to 1/(M.(N−1)) times and is reset by output signal of said 1/(N−1) time frequency divider, a delay circuit which receives output signal of said 1/(M.(N−1)) frequency divider and issues at least a first, a second and a third output signals having respective predetermined delay times from the received output signal, a ½ frequency divider which receives second output signal of said delay circuit and is reset by output signal of said 1/(N−1) frequency divider, a first N-phase head-switching circuit which, in recording mode, by receiving said first and said third output signals of said delay circuit and said output signal of said 1/(N−1) frequency divider thereby to generate N-phase head-switching signal to gate recording signal currents to respective N magnetic heads, a second N-phase head-switching circuit which in reproducing mode, by receiving second output signal of said delay circuit and said output signal of said 1/(N−1) frequency divider thereby to generate N-phase head-switching signal to gate reproduced signal current from respective N magnetic heads, servo-control means for controlling speed of a motor for driving said rotary head cylinder by receiving output of said ½ frequency divider, and N-phase head switching means which, responding to said N-phase head switching signal, operatively switches said N magnetic head so that selected one magnetic head is connected in turn to recording or reproducing circuit responding to spacial position with respect to said recording tape.

* * * * *